Sept. 24, 1940.     H. R. DOREMUS     2,216,002
LINE GUIDE FOR FISHING RODS
Filed March 18, 1939
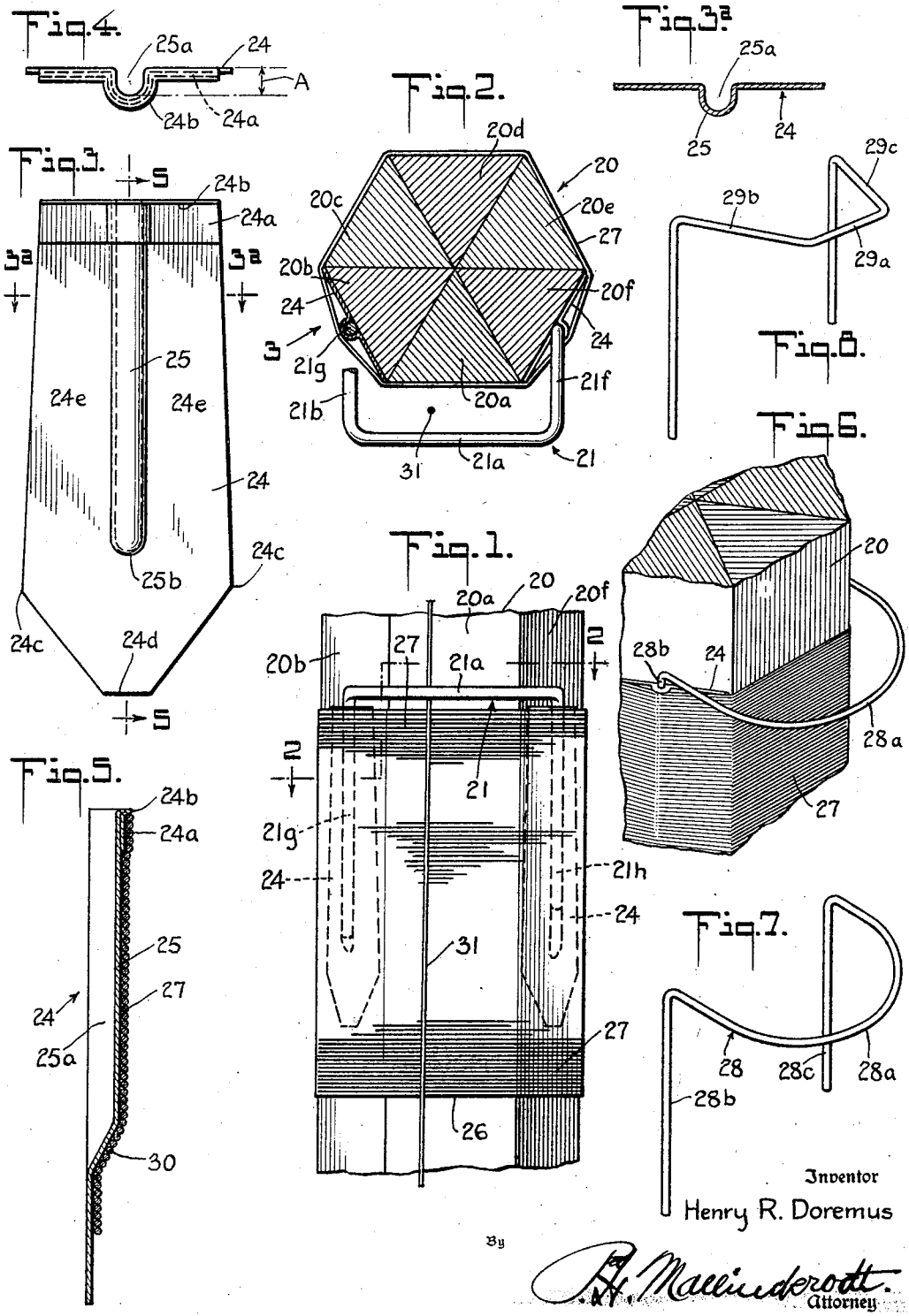
Inventor
Henry R. Doremus
By
R. H. Mallinckrodt
Attorney Patented Sept. 24, 1940

2,216,002

UNITED STATES PATENT OFFICE 2,216,002

LINE GUIDE FOR FISHING RODS

Henry R. Doremus, Provo, Utah

Application March 18, 1939, Serial No. 262,723

12 Claims. (Cl. 43—24)

This invention relates to a line guide for fishing rods and its principal objects are:

First. To provide a guide that is substantially permanent in the matter of wrappings by means of which it is attached to a rod, but in which the guide proper is replaceable or renewable almost instantly at any time.

Second. To provide security of fastening for the guide, while retaining maximum flexibility of the rod whereby whipping and/or tangling of the line is prevented.

Third. To save undue wearing out of fish lines because of mutual cutting between the line and the guide.

Fourth. To make it possible to replace a guide without having to remove the line for rethreading through the remaining guides.

Fifth. To make it possible to cast a line farther and more smoothly than heretofore.

Sixth. To be applicable to, and to provide maximum flexibility for, a fishing rod of any size and for any purpose.

Seventh. To render the upkeep of a rod much less expensive than has heretofore been possible.

To a skilled fisherman, fishing is an art, and he is extremely particular about his equipment, and especially so about his fishing rod. A light fishing rod will frequently weigh as little as four ounces, and naturally must have perfect balance. Therefore, anything that is attached to the rod, such as the guides, must have its design very carefully worked out, and must not add any substantial weight to the rod.

Heretofore, line guides have been attached to poles in a semi-permanent way, thereby requiring the expenditure of considerable time and labor in replacing the guides. Owing to the limitations in shape of the usual guides, coupled with the necessity of extremely light structure, the line passing through the usual guides, cuts and wears them out in relatively short times, so that in a single season, a moderately active fisherman may replace the guides at least three times. As there may be from 12 to 15 guides on a single rod, requiring often as much as three hours for an expert to replace, the saving in time and the convenience accomplished by the invention, may readily be perceived as its disclosure proceeds.

Briefly, the invention contemplates a guide proper having a loop portion supported on two parallel leg portions, which latter may be detachably held, preferably frictionally, in separate sheaths. The sheaths in turn, are permanently attached to the poles by means of wrappings of suitable threads or cords.

In the drawing which illustrates one embodiment of the invention,

Fig. 1 represents an elevation of a fragmentary section of a fishing rod, with a guide of the invention attached thereto;

Fig. 2, a plan partially in section, taken on the line 2—2 in Fig. 1;

Fig. 3, an elevation of an individual guide sheath looking in the direction of arrow 3 in Fig. 2, removed from the rod, this figure being drawn to an enlarged scale;

Fig. 3a is a cross section on line 3a—3a of Fig. 3;

Fig. 4, a plan corresponding to Fig. 3;

Fig. 5, a vertical section taken on the line 5—5 in Fig. 3;

Fig. 6, a view in perspective, of a guide of another shape, shown with a fragmentary portion of the rod to which it is attached;

Fig. 7, a view in perspective, of the guide of Fig. 6, removed from the rod to show its individual structure; and, Fig. 8, a view in perspective, of a guide having still another shape.

Referring to the drawing, the numeral 20 indicates the fragmentary portion of a fishing rod of the split bamboo type which is usually hexagonal in cross-section and composed of six longitudinally extending sections 20a to 20f, these being fastened together in a way which has nothing to do with the invention. The fishing rod may be of any other cross-section such as round, since the shape is immaterial.

The guide 21 may be made of piano wire of a proper size and be formed as indicated in Figs. 1 and 2, in this form the front portion 21a extends substantially parallel to the front face of the rod section 20e, and has the two backwardly extending side portions 21b and 21f, from which in turn, legs 21g and 21h extend downwardly, substantially in contact with the outside faces of the rod sections 20b and 20f. One of the legs, for example 21g, is longer than the other, for a purpose which will presently appear. Frictionally gripping the legs 21g and 21h, and holding them in snug contact with the outside faces of the respective sections 20b and 20f, are the respective sheaths or holders 24, these having the vertically extending channels 25, forming grooves 25a disposed substantially central of the sheath. The upper marginal portion of the shield may be bent back upon itself, as indicated at 24a, in order to reinforce the same for strength. Extending along the upper edge of the sheath is a lip 24b, the purpose of which will presently appear. The sheath is preferably tapered from the bottom towards the top, somewhat as indicated in Fig. 3, the lower points 24c of this taper being located below the points 25b of the channel 25. The sheath may extend to a suitable distance below the points 24c, as indicated at 24d.

While the complete guide means may include the guide proper 21, together with two sheaths 24, as indicated in the Figures 1 and 2, yet this assembly is ordinarily spoken of simply as a "guide."

Assembling of a guide means with a rod, may begin at a point such as 26, Fig. 1, by closely wrapping the rod with a layer of flexible material 27, for example, silk thread for the lighter rods, and heavy cord for the larger ones. This wrapping extends upwardly of the rod to the desired extent, at which point the guide with its sheath is placed in the position indicated in Figs. 1 and 2, and the wrapping continued until the top of the sheath is reached, the last thread being crowded and fastened into position under the lip 24b much after the manner indicated in Fig. 5.

In this connection it is to be noted that the distance "A," Fig. 4, indicating the depth of the groove 25a, may advantageously be a trifle less than the diameter of a leg 21g or 21h which is to be inserted therein. This provides for a binding action upon a leg between the sheath and the surface of the rod, when that leg is pushed into its groove, and also for holding it frictionally therein. The holding power of the sheaths is enhanced by the tight wrapping 27 which springs the two sides of the grooved portion together. Thus the sheaths exert continuously, a yielding grip upon the guides proper, rendering the latter easily removable and replaceable at any time, it being only necessary to overcome the frictional grip for pulling a guide member out of its sheaths, or for pushing it into its sheaths.

The performance of the binding action referred to in the preceding paragraph, is novel and of great importance. It results, because the winding 27 has considerable elasticity and when the channel 25 is vacant, normally holds the inner faces of the shield wings 24e snugly against the corresponding face of the rod. The winding 27 also holds the outer side edges of the wings snugly in substantial coincidence with the edges of the corresponding rod face. Therefore, when a guide leg is pushed into a channel 25, its diameter being greater than the dimension "A," the leg naturally pushes outwardly in substantially an axial plane, against the inner surface of the channel U-bend and thereby draws the extremities of the U-legs away from the face of the rod. At the same time, the side edges of the wings cannot move outwardly, but on the contrary, tend to be moved slightly inwardly because of the tension in the winding 27. This causes the opposite sides of the U-channel to close in against the guide leg and to exert a clamping action thereon along two longitudinal elements which lie substantially in an axial plane transverse to the axial plane first mentioned. Thus, each guide leg is yieldingly and doubly clamped along its length, which provides a frictional fastening of maximum holding power and durability.

Fishing rods are made in a great many different sizes and types, dependent upon the exact purpose for which they are to be used. For example, a fly rod is very light and the wrapping 27 in such a case, would consist of 00 sewing silk. In a trolling rod a much heavier thread would be used, while in a deep-sea fishing rod an extremely heavy cord would be used. Likewise, the guide member 21 and the sheath 24 would vary greatly in size and strength for the different kinds of fishing rods. For example, in a fly fishing rod the distance between the legs 21b and 21f in the clear, might be ⅜-inch for a guide located near the lower end of the rod, and considerably smaller than this for a guide at the upper end of the same rod. The sheaths used on a light pole might be made of very thin sheet brass, varying from $\frac{2}{1000}$-inch to $\frac{10}{1000}$-inch in thickness, and the length thereof may vary from ¾-inch to 1¼ inch. However, none of the specific sizes herein mentioned, are in any way intended to restrict the invention, specific sizes being given merely as examples.

In Fig. 6, the guide proper 28, instead of having its front and sides at substantially right angles to each other, may have the front portion curved, as indicated at 28a. In Fig. 7, the guide proper 28 is shown individually, removed from its holders or sheaths. One of the legs of the guide 28, for example the one at 28b, may be longer than the other, for the same reason that the lengths of the two legs of the guide 21, Figs. 1 and 2, are different, the reason being that when a guide is to be inserted in its sheath, it is much easier to accomplish this result when one leg is entered in its corresponding sheath first, and later, the second leg in its corresponding sheath.

While the shapes of the guides 21 and 28 as shown, are generally preferred, other shapes too, are frequently used, for example, such as the one indicated at 29 in Fig. 7. In this, the front 29a might be straight, and the two side portions 29b and 29c, inclined, somewhat after the manner shown.

It is to be particularly noted that in applying a sheath, such as 24, to a rod, and wrapping the same as hereinbefore described, that the thread in winding, should first tie down the side portions of the sheath before starting to climb up the incline at 30, which it must do in wrapping around the outside of the channel 24, as indicated for example in Fig. 2. This prior tying down is accomplished by having the points 24c a suitable distance below the point 25b, Fig. 3, as hereinbefore mentioned.

In the case of round poles, the relative position of the sheaths could be maintained, but the wings 24e thereof, instead of conforming to the straight faces of a polygonal figure, would naturally conform to the arc of a circular cross-section.

Attention is directed especially to the wide spacing between the two legs of the guide member, and to the generous opening that is provided in the loop, all of which is made possible by means of the invention, and which tends to reduce to a minimum, contact between a loop and a line, as the latter runs out or is pulled in. When, ultimately, a loop is roughened from an unavoidable minimum contact with a line, the loop may be replaced by a new one in a fraction of a minute, noticeably without molesting the line.

Quick replacement of guides is especially appreciated in the field where guides are subject to destruction because of catching in brush or from other rough usage. The taper from bottom to top of the sheaths, when wrapped on a rod, prevents them from being pulled out, because of the close frictional contact with the guide legs, when a guide is pulled out for any reason. The normal position of a line is indicated at 30.

While a specific embodiment of the invention is herein shown and described, it is to be understood that numerous minor changes may be made therein without avoiding the following claims.

Having fully described my invention, what I claim is:

1. Guide means for fishing rods, including in combination, a rod, a guide member proper having a frontal portion, side portions spaced apart from each other and extending backward from the frontal portion, a leg extending from each side portion, the said legs paralleling each other, and sheaths attached to the said rod, the said sheaths being so disposed that said legs may be selectively pushed into the shields or be withdrawn therefrom without disturbing the integrity of permanence of the shields.

2. Guide means for fishing rods, comprising a rod, a guide member having spaced-apart legs extending parallel in the same general direction, a gripping sheath for each leg, and means disposed to secure the gripping sheaths to the rod.

3. Guide means for fishing rods in accordance with claim 2, wherein the gripping sheaths are secured to the rod by means of a continuous flexible wrapping extending around the sheaths and around the rod.

4. Guide means for fishing rods, comprising a rod, a guide member having parallel depending legs, sheaths disposed to frictionally hold the said legs against the rod, each sheath being of sheet form tapered from bottom to top, and wrapping means extending around the sheaths and the rod.

5. A sheath for a leg of a line guide attached to a fishing rod, including in combination, a channel extending longitudinally of the said leg, the said channel having a width closely approximating the diameter of the leg and a depth slightly less than the said diameter, wings extending outwardly from the sides of the channel, and wrapping means effective to yieldingly hold the sheath against the rod so that upon insertiton of the guide leg in the sheath channel the sheath is caused to yieldingly clamp the leg.

6. A sheath for a leg of a line guide attached to a fishing rod in accordance with claim 5, in which the said clamping action is yieldingly exerted substantially along two intersecting axial planes.

7. A sheath for a leg of a line guide attached to a fishing rod, comprising a channel disposed to slidably receive the said leg, wings extending from the sides of the said channel, a lip protruding outwardly from a transverse edge of the said sheath, and a wrapper extending around the sheath and the said rod; the said protruding lip forming a limit stop for the said wrapper.

8. A sheath for a leg of a line guide attached to a fishing rod, comprising a channel disposed to contain the said leg, wing portions extending from both sides of the said channel, and wrapping means extending over the sheath and the rod and bearing on the said wing portions whereby the sides of the said channel are caused to grip the said leg.

9. A sheath for a leg of a line guide attached to a fishing rod, in accordance with claim 8, wherein the said wing portions are tapered from the bottom to the top thereof for the purpose of preventing accidental pulling-out of the sheath from the said wrapping means.

10. A sheath for a leg of a line guide attached to a fishing rod, including in combination, clamping means at least partially encircling the said leg, and a wrapper disposed to impart a gripping action to the said clamping means.

11. A sheath for a leg of a line guide attached to a fishing rod, in accordance with claim 10, wherein the said sheath is engaged by the said wrapper in a manner such that the sheath is prevented from being accidentally pulled out of the wrapper.

12. A fishing rod, including in combination, a rod, a line, and a guide for the said line, the said guide including a leg, a channel having a U-bend in which the said leg is slidably insertable, wings spreading outwardly from the said channel and disposed to contact the said rod, and a wrapper disposed to simultaneously contact the outside of the said U-bend and the side edges of the said wings; the said combination being so constituted that insertion of the said leg into the said channel yieldingly stresses the said wrapper.

HENRY R. DOREMUS.